United States Patent
Sumida et al.

(10) Patent No.: US 8,189,634 B2
(45) Date of Patent: May 29, 2012

(54) METHOD OF MANUFACTURING A LASER GAIN MEDIUM HAVING A SPATIALLY VARIABLE GAIN PROFILE

(75) Inventors: David S. Sumida, Los Angeles, CA (US); Robert W. Byren, Manhattan Beach, CA (US); Michael Ushinsky, Irvine, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/191,775

(22) Filed: Jul. 27, 2011

(65) Prior Publication Data
US 2011/0281387 A1 Nov. 17, 2011

Related U.S. Application Data

(62) Division of application No. 11/404,338, filed on Apr. 14, 2006, now Pat. No. 7,995,631.

(51) Int. Cl.
*H01S 3/16* (2006.01)
(52) U.S. Cl. .............. 372/41; 372/40; 372/39; 438/531; 438/543
(58) Field of Classification Search .............. 372/41, 372/40, 39; 438/531, 546
See application file for complete search history.

(56) References Cited

U.S. PATENT DOCUMENTS

| 2003/0072340 A1* | 4/2003 | Mirov et al. ..... 372/39 |
| 2004/0028101 A1* | 2/2004 | Byren et al. ..... 372/39 |

* cited by examiner

*Primary Examiner* — Kinam Park

(57) ABSTRACT

Method of manufacturing a laser medium with a material having a surface and a dopant in the material distributed whereby the material has a spatially variant optical flux density profile uses tailored non-uniform gain profiles within a Yb:YAG laser component (rod, slab, disc, etc.) achieved by a spatial material modification in the spatially masked preforms. High temperature-assisted reduction leads to the coordinate-dependent gain profiles, which are controlled by the topology of the deposited solid masks. The gain profiles are obtained by reducing the charge state of the laser-active trivalent $Yb^{3+}$ ions into inactive divalent $Yb^{2+}$ ions. This valence conversion process is driven by mass transport of ions and oxygen vacancies. These processes, in turn, affect the dopant distribution throughout the surface and bulk laser crystal. By reducing proportionally more $Yb^{3+}$ ions at the unmasked areas of component, than in the masked areas, the coordinate-dependent or spatially-controlled gain profiles are achieved. The material can be used for the fabrication of laser rods, slabs, etc. with various concentrations and spatial localizations of dopants.

39 Claims, 2 Drawing Sheets

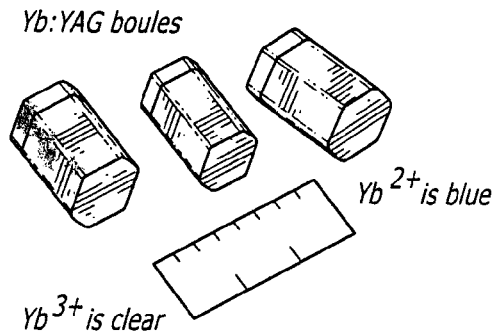
FIG. 1
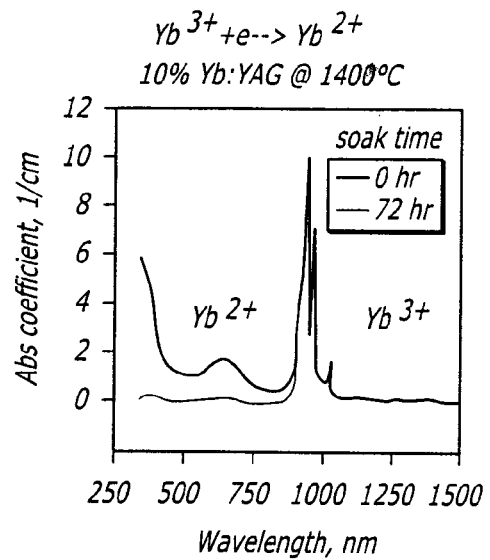
FIG. 2
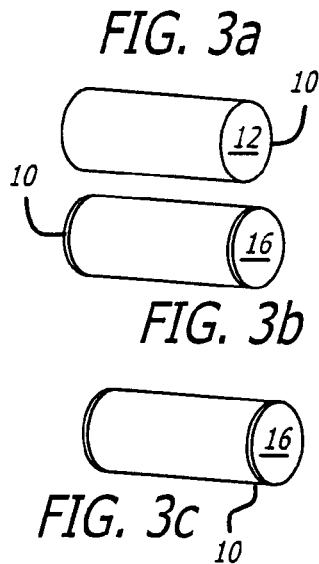
FIG. 3a
FIG. 3b
FIG. 3c
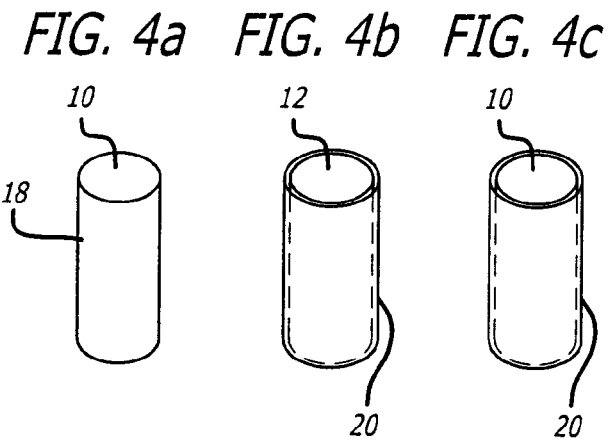
FIG. 4a  FIG. 4b  FIG. 4c

METHOD OF MANUFACTURING A LASER GAIN MEDIUM HAVING A SPATIALLY VARIABLE GAIN PROFILE

CROSS-REFERENCE TO RELATED APPLICATION

This application is a division under 35 U.S.C. §121 of U.S. Ser. No. 11/404,338 filed Apr. 14, 2006, now U.S. Pat. No. 7,995,631, issued Aug. 9, 2011, the contents of which is incorporated herein in its entirety.

BACKGROUND

The present invention relates to high-energy lasers. More specifically, the present invention relates to the fabrication of solid-state laser crystal and ceramic components and preforms having non-uniform gain profiles.

High-energy lasers (HELs) are currently being evaluated for military and industrial applications. Solid-state lasers have shown considerable promise for this application. A solid-state laser typically includes a laser amplifier mounted within a laser resonator. The resonator provides the feedback necessary to build oscillation within the laser. The bulk laser active medium of the laser amplifier may be in the shape of a slab, rod or disk. When pumped, the medium provides amplification. The provision of reflective gratings at the ends of the active medium provides a resonator.

In a typical laser, an incoherent light source imparts energy to the lasing medium, which produces light in which the waves are in phase through particular electron transitions. Where the lasing medium is properly designed, this 'coherent light' is emitted as a beam. In certain cases, it is desirable that the emitted beam of coherent light be more intense than naturally occurs from the lasing medium. A Q-switched, pulsed laser has been developed for this purpose.

The pulsed laser contains a light controller termed a Q-switch which limits the buildup of light reflecting back and forth within the laser resonator until it reaches some selected value, at which time the growth of the internal wave rapidly increases and the threshold for laser action is reached. After releasing the built-up, light energy as a pulse, the Q-switch recovers to its prior function of restraining the light energy until the intensity is high enough for another pulse. Very high peak powers and beam energies can be achieved in this manner. Electrical, mechanical, and passive Q-switches are known in the art. The theory of operation of the passive Q-switch is described in detail in Koechner, specifically for organic dye and radiation-induced color-center saturable absorbers. See Solid State Laser Engineering, by W. Koechner, 2nd Ed., Springer-Verlag, Berlin, pp 437-442 (1988). See also U.S. Pat. No. 4,833,333, issued May 23, 1989 to Stephen C. Rand and entitled SOLID STATE LASER Q-SWITCH HAVING RADIAL COLOR CENTER DISTRIBUTION.

Commercial laser components are typically comprised of single crystals, such as Yb:YAG (ytterbium doped yttrium-aluminum-garnet) or polycrystalline transparent ceramics, such as YAG [$Y_3Al_5O_{12}$ or Y(sub 3)Al(sub 5)O(sub 12)]. Crystal lasers, doped with an active ion, often use one or more flash lamps or laser diodes to provide 'pump light'. The diode pump light excites the active ions in the doped crystal or ceramic gain medium to a higher energy state. This process is known as "absorption". A "pump cavity" typically contains a uniformly doped gain medium, which may be a crystal or glass or polycrystalline element fabricated in the shape of a rod, slab, or disk; and other elements, such as a pump light reflector or relay optics. Pump light is coupled into the cavity, typically with one or more flash lamps or laser diodes, either from the side of the cavity, known as 'side-pumping', or the end of the cavity, known as 'end pumping'.

The laser is created by placing the doped medium and pump cavity in the resonator. The resonator reflects photons created by spontaneous emission, i.e. those generated by the normal decay of the excited ions, and amplified by stimulated emission. For example, mirrors placed at either end of the doped medium and aligned perpendicularly to its longitudinal axis form a laser resonator. If the resonator is properly sized and a sufficient number of photons are reflected back and forth within the resonator so that the "gain" exceeds the 'loss', a laser oscillation will build up from spontaneous stimulated emission, i.e. 'lasing' will occur, producing laser light. Laser light is typically extracted from the doped medium in the pump cavity along the longitudinal axis. Pump cavities are discussed in W. Koechner, Solid-State Laser Engineering, ch. 6, 3rd edition, Springer Verlag (1992).

Efficient absorption, in which nearly all of the pump light is absorbed by the doped medium, is a primary goal of laser designers. One method of attaining efficient absorption is by using high-absorption (highly doped) laser materials. A ray of pump light going through a doped crystal one time is known as a 'pass'. With most existing designs, a pump light ray makes only one or two passes through the doped crystal before escaping, necessitating the use of high-absorption materials to achieve efficient absorption. Absorption is governed by an exponential function. Thus, when such a crystal is side-pumped, non-uniform absorption and thus non-uniform gain often result, with the highest gain being near the edge of the lasing medium. The concentration of gain near the edge of the medium leads to problems with parasitic oscillation and amplified spontaneous emission (ASE), extraction, efficiency, and beam quality (mode control). This is particularly problematic with respect to rod shaped media.

A number of technical approaches have been implemented over the years to address the spatial beam quality, including intra-cavity apertures and specific resonator point designs for optimal performance at a specific output power. However, problems with intra-cavity apertures have been encountered including losses, active alignment and the possibility of damage, as the result of the introduction of such components into the resonator.

Custom or specific resonator point designs for optimal performance at a specific output power are problematic inasmuch as such designs are, by definition, only suitable for one power, and therefore are especially susceptible to performance degradation as the resonator or pump cavity components change.

By introducing a distributed spatial filter within the rod itself, the prior-art intra-cavity aperture can be eliminated. This approach is disclosed and claimed in the above-identified '462 application of It. W. Byren and D. Sumida. This Application details the design and fabrication of spatially-doped Q-switches and laser pump cavities, having a dopant in two different valence states. The valence densities are radially dependent and increase or decrease over the radius of the laser rod. With this technique, a desirable radial profile of the second valence state can be obtained by means of oxidation-assisted or reduction-assisted heat treatment. For example, the reduction-assisted treatment leads to conversion of the laser-active trivalent $Yb^{3+}$ ions into inactive divalent $Yb^{2+}$ ions due to the thermally activated mass transport of ions and oxygen vacancies. The use of the time and temperature profile teaching of the '462 application enable fabrication of laser components with a desired coordinate-dependent valence density. This, in turn, yields devices with more uniform cross-sectional gain profiles.

Unfortunately, crystal and ceramic rods having radially-dependent gain profiles in accordance with the method taught in the '462 application have created other problems due to the fact that the valence conversion effected thereby on the end faces and ends of the barrels of the rods may adversely affect the operation of the laser.

Hence, a need remains in the art for a system or method for fabricating gain media for high energy lasers with nonuniform cross-sectional gain profiles spatially contoured with respect to the exterior surfaces thereof.

SUMMARY

The need in the art is addressed by the medium and method for manufacturing same of this disclosure. The inventive medium includes a material having a surface and a dopant in the material distributed whereby the material has a spatially variant optical flux density profile.

In an illustrative embodiment, the spatially variant profile is effected with a spatially dependent mask. The dopant has a first species at a first valence state and a second species at a second valence state. The concentration of said dopant species at said first valence state increases with distance from said surface and the concentration of said dopant species at said second valence state decreases with distance from said surface.

In the illustrative embodiment, coordinate-dependent gain profiles are obtained by heat treatment of spatially masked Yb:YAG crystals or Yb-doped Y(sub 3)Al(sub 5)O(sub 12) ceramics in a reducing environment. The treatment leads to conversion of the laser-active trivalent $Yb^{3+}$ ions into inactive divalent $Yb^{2+}$ ions due to the thermally activated mass transport of ions and oxygen vacancies in the unmasked zones. The masks may be thick coatings of high temperature glasses and oxide ceramics.

In accordance with an embodiment, tailored non-uniform gain profiles within a Yb:YAG laser component (rod, slab, disc, etc.) are achieved by a spatial material modification in the spatially masked pre-forms. High temperature-assisted reduction leads to the coordinate-dependent gain profiles, which are controlled by the topology of the deposited solid masks. The gain profiles are obtained by reducing the charge state of the laser-active trivalent $Yb^{3+}$ ions into inactive divalent $Yb^{2+}$ ions. This valence conversion process is driven by mass transport of ions and oxygen vacancies. These processes, in turn, affect the dopant distribution throughout the surface and bulk laser crystal. By reducing proportionally more $Yb^{3+}$ ions at the unmasked areas of component, than in the masked areas, the coordinate-dependent or spatially controlled gain profiles are achieved.

Masking materials may be high temperature ceramic glazes and glasses. The masking includes the fabrication of frit, mixing this fit with de-ionized water to form slurry, deposition of the slurry on the surface of laser component or preform, and a heat treatment (firing) of the deposited layer. This disclosure can be used for the fabrication of laser rods, slabs, etc. with various concentrations and spatial localizations of dopants.

BRIEF DESCRIPTION OF THE DRAWINGS

FIG. 1 are perspective views showing Yb:YAG crystal preforms in two valence states, $Yb^{2+}$ and $Yb^{3+}$ in accordance with the teachings of the above-referenced '462 application.

FIG. 2 is a graph showing details the difference in absorption spectra for a 10%-doped Yb:YAG crystal that was processed at 1400° C. for 72 hrs. in accordance with above-referenced '462 application.

FIG. 3a-c are diagrams that schematically illustrate the valence conversion process for Yb:YAG rods with the glaze masked end faces in accordance with the present teachings.

FIG. 3a shows a perspective end view of a fabricated preform.

FIG. 3b is a perspective end view of the preform with a glazing of the end faces thereof.

FIG. 3c is a perspective end view of the preform showing the result of heat treatment to effect a valence conversion to achieve the desired spatially variant gain profile.

FIGS. 4a-c are diagrams that schematically illustrate the valence conversion process for Yb:YAG rods with the glaze masked lateral surfaces and open end faces in accordance with the present teachings.

FIG. 4a shows a perspective side view of a fabricated preform.

FIG. 4b is a perspective side view of the preform with a glazing along the barrel thereof.

FIG. 4c is a perspective side view of the preform showing the result of heat treatment to effect a valence conversion to achieve the desired spatially variant gain profile.

DETAILED DESCRIPTION

Figure 5A:
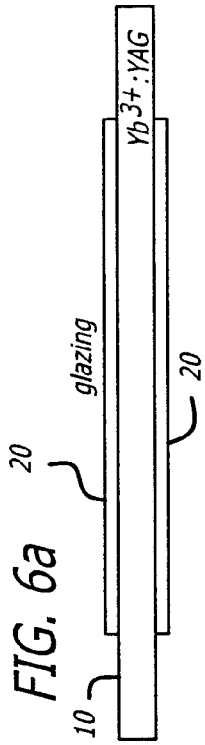
FIGS. 5a-c are diagrammatic top views of a medium that illustrate valence conversion in the processed Yb:YAG slab that includes the glaze-masked top and bottom surfaces in accordance with an illustrative embodiment of the present invention.

Illustrative embodiments and exemplary applications will now be described with reference to the accompanying drawings to disclose the advantageous teachings of this disclosure.

While this disclosure is described herein with reference to illustrative embodiments for particular applications, it should be understood that the inventive concept is not limited thereto. Those having ordinary skill in the art and access to the teachings provided herein will recognize additional modifications, applications, and embodiments within the scope thereof and additional fields in which the present disclosure would be of significant utility.

In Yb-doped YAG crystal or Yb-doped and sintered polycrystalline YAG ceramics, the active ions of Yb can exist in two valence states, $Yb^{2+}$ and $Yb^{3+}$. The optical spectra of Yb-doped YAG crystal and ceramics in the range of 200 to 1200 nm exhibit absorption bands due to $Yb^{2+}$ and $Yb^{3+}$ ions, including 4f to 4f transitions on $Yb^{3+}$ band, as well as 4f to 5d transitions on $Yb^{2+}$ band. In addition to these bands, one more band due to $Yb^{2+}$ to $Yb^{3+}$ inter-valence charge-transfer can be observed. The Yb2+ absorption bands are responsible for the blue color of the Yb:YAG crystal. High temperatures, above about 850° C., and oxidation lead to the bleaching of the blue color Yb:YAG. Internal oxidation is associated with both the transport of the oxidizing defects and the diffusion of the reduced valence $Yb^{2+}$ ions. The oxidation kinetics was found to follow a parabolic rate law. See "*An Optical In-Situ Study* of the Re-Oxidation Kinetics of Mixed valent Yb3Al5O12" published by M. Kreye and K. D. Becker in Phys. Chem. Chem. Phys., 5, 2283-2290 (2003) for an analysis of the oxidation kinetics mechanisms for the 861 to 1065° C. temperature interval.

In accordance with this disclosure, tailored non-uniform gain profiles within a material such as a Yb:YAG laser component (rod, disc, etc.) are obtained by means of spatial material modification in the spatially masked pre-forms. High temperature-assisted reduction leads to the coordinate-dependent gain profiles, which can be predicted and controlled by the topology of the deposited glass, glaze, or ceramic masks. The gain profiles may be obtained by reducing the charge state of the laser-active trivalent $Yb^{3+}$ ions into inactive divalent $Yb^{2+}$ ions in the unmasked zones of laser component or preform. The valence conversion process is driven by mass transport of ions and oxygen vacancies. These processes in turn affect the dopant distribution throughout the surface and bulk laser crystal. In the unmasked zones, the optical flux density profiles follow the Fick's law. In the masked zones, mass transfer of oxygen through the glass or ceramic coating is nearly prevented, so the conversion of the laser-active trivalent $Yb^{3+}$ ions into inactive divalent $Yb^{2+}$ ions is excluded. By reducing proportionally more $Yb^{3+}$ ions in the unmasked areas of the component, than in the masked areas, the coordinate-dependent or spatially-controlled gain profiles can be achieved. Several additional degrees of freedom are available in the design of laser components using the present technique that are not available with the prior art radially-dependent valence conversion technology, including the fabrication of "end caps" with low active ion concentration in a single laser crystal.

In accordance with the disclosure, the precisely tailored non-uniform gain profiles within the Yb:YAG laser component (rod, slab, disc, etc.) are obtained by means of spatial material modification in the spatially masked pre-forms. High temperature-assisted reduction leads to the coordinate-dependent gain profiles, which can be predicted and controlled by the topology of the deposited glass, glaze, or ceramic masks. The gain profiles are obtained by reducing the charge state of the laser-active trivalent $Yb^{3+}$ ions into inactive divalent $Yb^{2+}$ ions in the unmasked zones of laser component or preform.

FIG. 1 is a perspective view showing Yb:YAG crystal preforms in two valence states, $Yb^{2+}$ and $Yb^{3+}$. The $Yb^{3+}$ doped YAG preform is clear, while the $Yb^{2+}$ doped YAG is blue colored. When the $Yb^{2+}$ doped crystals are heated above 850° C., oxidation leads to the bleaching of the blue color Yb:YAG.

FIG. 2 is a graph showing the difference in absorption spectra for a 10%-doped Yb:YAG crystal that was processed at 1400° C. for 72 hrs. The valence conversion process is driven by mass transport of ions and oxygen vacancies. These processes in turn affect the valence distribution throughout the surface and bulk laser crystal. In the unmasked zones, the optical flux density profiles follow Fick's law. In the masked zones, mass transfer of oxygen through the glass or ceramic coating is nearly prevented, so the conversion of the laser-active trivalent $Yb^{3+}$ ions into inactive divalent $Yb^{3+}$ ions is excluded. By reducing proportionally more $Yb^{3+}$ ions at the unmasked areas of the component than in the masked areas, the coordinate-dependent or spatially-controlled gain profiles are achieved.

FIG. 3a-c schematically show the valence conversion process for Yb:YAG rods with the glaze masked end faces in accordance with an illustrative embodiment of the present teachings.

FIG. 3a shows a perspective end view of a fabricated preform 10 having end faces 12 and 14 (not shown).

FIG. 3b is a perspective end view of the preform 10 with a glazing 16 on the end faces 12 and 14 thereof.

FIG. 3c is a perspective end view of the preform 10 showing the result of heat treatment to effect a valence conversion to achieve the desired spatially variant gain profile. The reduction of more $Yb^{3+}$ ions in the unmasked rod periphery than in the masked center of the rod, maximizes the gain along the resonator-mode axis, and steadily decreases towards the rod periphery. Thus, in the case of a Yb:YAG laser rod, the process results in modified material having a spatially-dependent active ion concentration so a laser rod can be fabricated that has higher optical gain in the center.

The spatial gain profile is automatically aligned within the resonator since it is fabricated symmetrically about the center of the rod itself. No sharp aperture is required in the laser cavity for transverse mode control; therefore, the probability of optical damage is significantly reduced.

In another embodiment, a Yb:YAG slab can be masked and thermally processed to spatially modify the gain profile (primarily in the transverse and longitudinal directions) in Yb-doped YAG planar gain-media components. The thermal treatment leads to the valence conversion of $Yb^{3+}$ into the divalent $Yb^{2+}$ in the unmasked zones only. See FIGS. 4a-c.

FIGS. 4a-c are diagrams that schematically illustrate the valence conversion process for Yb:YAG rods with the glaze masked lateral surfaces and open end faces in accordance with the present teachings.

FIG. 4a shows a perspective side view of a fabricated preform 10 with a barrel 18.

FIG. 4b is a perspective side view of the preform 10 with a glazing 20 along the barrel 18 thereof.

FIG. 4c is a perspective side view of the preform 10 showing the result of heat treatment to effect a valence conversion to achieve the desired spatially variant gain profile. The present teachings allow fabrication of YAG components that have a nearly uniform $Yb^{3+}$ doped central portion and valence reduced $Yb^{2+}$ doped end portions.

Figure 5B:
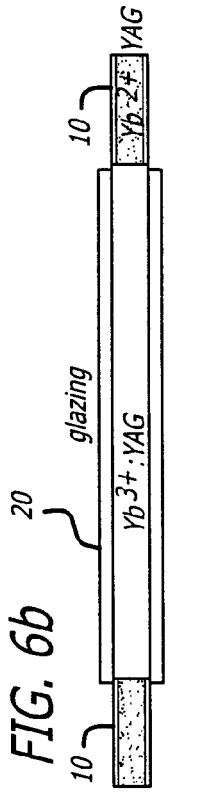
Figure 5C:
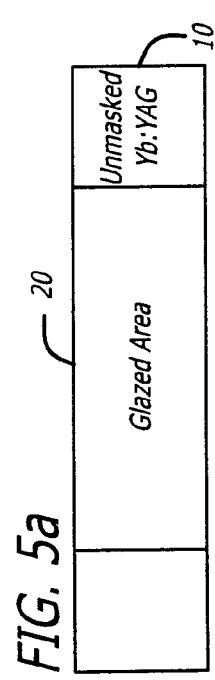

FIGS. 5a-c are diagrammatic top views of a medium that illustrate valence conversion in the processed Yb:YAG slab that includes the glaze-masked top and bottom surfaces in accordance with an illustrative embodiment of the present disclosure.

Figure 6A:
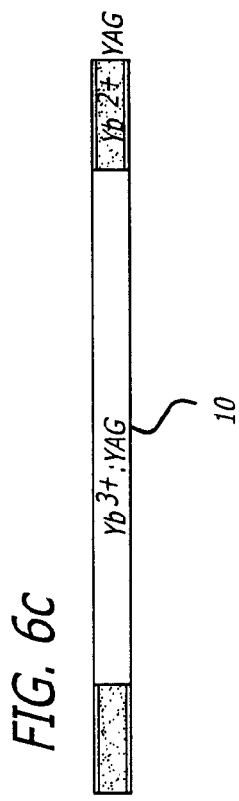
FIGS. 6a-c are diagrammatic side views of a medium that illustrate valence conversion in the processed Yb:YAG slab that includes the glaze-masked top and bottom surfaces in accordance with an illustrative embodiment of the present invention.
Figure 6B:
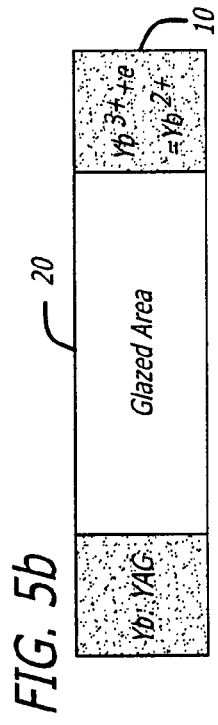
Figure 6C:
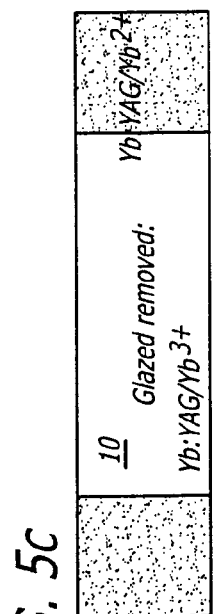

FIGS. 6a-c are diagrammatic side views of a medium that illustrate valence conversion in the processed Yb:YAG slab that includes the glaze-masked top and bottom surfaces in accordance with an illustrative embodiment of the present disclosure. First, in accordance with the present teachings, a mask 20 is applied to the upper and lower surfaces of a medium 10 as shown in FIGS. 5a and 6a. Next, the glaze is heat treated (fired). Then, the medium 10 is heated in a vacuum or gaseous environment to effect the valence conversion process. This results in a change in the dopant species as depicted in FIGS. 5b and 6b. Finally, the glaze is removed as shown in FIGS. 5c and 6c. The resulting component is an ideal core layer that can be further encapsulated in crystal cladding or glazed.

The gaseous environment could be an oxidizing environment (e.g., containing oxygen or other oxidizing species) or a reducing environment (e.g., containing hydrogen or other reducing species).

Any suitable masking material may be used such as high temperature ceramic glazes, ceramics, and glasses by way of example. Among this group are $CaO-Al_2O_3-SiO_2$, $CaO-Al_2O_3$, $MgO-Al_2O_3-SiO_2$ glasses, $ZrO_2$, $8Y_2O_3-ZrO_2$, and a few similar ceramics. See "Joining of Single-Crystal Sapphire to Alumina Using Silicate Glasses" by S. Fuijitsu et at, Journal of Ceramic Society of Japan, 111, 7, 448-451, (2003) and "*Characterization of Modified Thick Thermal Barrier Coatings Thermal Spray*" by S. Ahmaniemi et al., Advancing the Science & Applying the Technology. ASM Int., 1477-1486 (2003).

For example, 34CaO-30Al$_2$O$_3$-36SiO$_2$, and a few more similar glasses are able to withstand high temperature (850 to 1150° C.) processing. The masking materials also include Ta$_2$O$_5$ and several others Ta$_2$O$_5$ based high temperature ceramic oxides. As shown in U.S. Pat. No. 6,159,553 issued Dec. 20, 2000 to Ch. Li and T. E. Strangman and entitled THERMAL BARRIER COATING FOR SILICON NITRIDE, the teachings of which are hereby incorporated herein by reference, a tantala coating of 2 to 500 microns in thickness can effectively protect the substrate surface from oxidation. In the case of processing that is limited by 1350° C., the tantalum pentoxide remains in its initial, low-temperature beta-phase. At about 1350° C., it exhibits a phase transformation to a high temperature alpha-phase. This transformation is accompanying the change in volume that leads to cracking of the coating.

Similar effects are also known in the field of zirconia possessing, the phase transformation occurring at about 1000° C. US Patent application 20050013993 shows ceramic compositions that include the 50% of AlTaO$_4$, and the balance comprising at least one metal oxide selected from the group consisting of Ta, Al, Cr, Hf, Ti, Zr, Mo, Nb, Ni, Sr, Mg, Si, and the rare earth elements (Y) in a small concentration. For example, this coating can comprise about 50% of AlTaO$_4$, and the balance may consist essentially of Ta$_2$O$_5$ or Al$_2$O$_3$. These coatings exhibit a CTE (coefficient of thermal expansion) in the range from about 4 ppm to 6 ppm, and therefore may be very suitable as a masking material.

All the aforementioned masks typically exhibit high density film formation. The masking coatings are also thermally compatible with YAG; the estimated CTE mismatch with YAG is less than $1\times10^{-6°}$ C.$^{-1}$. The mask coating process includes the fabrication of a frit, mixing this frit with de-ionized water to form a slurry, deposition of the slurry on the surface of the laser component or pre-form, and heat treating (firing) the deposited layer. After the thermal treatment to effect the valence conversion, the deposited mask can be stripped by means of grinding and polishing. Due to the conformity of the crystal shape, the glazing technique can be used for the fabrication of laser components having different configurations (rods, slabs, disks, etc.) with various concentrations and spatial localization of active ions.

With the addition of reflective elements and a pump source, the rod may be used to implement a laser. This is depicted in FIG. 7.

Figure 7:
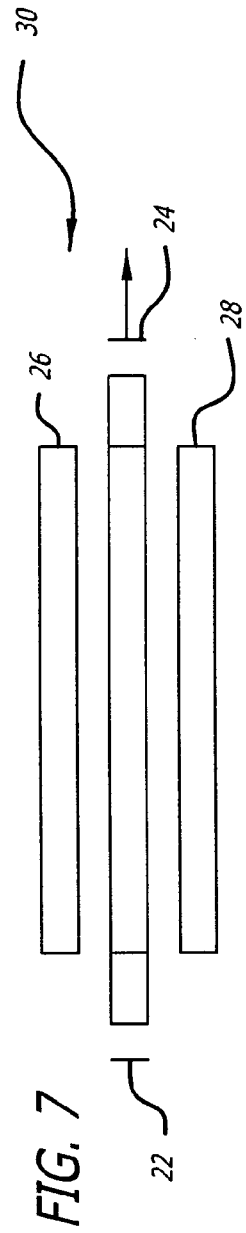
FIG. 7 is a simplified side view of a laser implemented with a medium fabricated in accordance with the present teachings.

FIG. 7 is a simplified side view of a laser implemented with a medium fabricated in accordance with the present teachings. The laser 30 includes a medium 10 with a spatially variant gain profile disposed between a totally reflective surface 22 and a partially reflective surface 24 to form a pump cavity. First and second pump sources 26 and 28 are disposed to pump energy into the medium as is common in the art. As a result of the population inversion created by the pumping process, a stimulated emission is achieved.

Thus, the inventive concept has been described herein with reference to a particular embodiment for a particular application. Those having ordinary skill in the art and access to the present teachings will recognize additional modifications applications and embodiments within the scope thereof. These components can be used as Q-switches, oscillators, laser pump cavity devices and for other applications and purposes as will be appreciated by those of ordinary skill in the art.

It is therefore intended by the appended claims to cover any and all such applications, modifications and embodiments within the scope of the present disclosure.

What is claimed is:

1. A method of manufacturing a laser medium, comprising:
   providing a laser medium;
   doping said laser medium to achieve a predetermined spatially variant optical flux density profile; and
   masking said laser medium with a mask to achieve said predetermined spatially variant optical flux density profile.

2. The method of claim 1, wherein said masking comprises applying a glaze on said laser medium.

3. The method of claim 2, wherein applying said glaze comprises applying a high temperature ceramic glaze on said laser medium.

4. The method of claim 1, wherein said masking comprises applying a ceramic mask on said laser medium.

5. The method of claim 1, wherein said masking comprises applying a glass mask on said laser medium.

6. The method of claim 1, wherein said masking comprises applying at least one of CaO—Al$_2$O$_3$—SiO$_2$, CaO—Al$_2$O$_3$, MgO—Al$_2$O$_3$—SiO$_2$, ZrO$_2$, 8Y$_2$O$_3$—ZrO$_2$, 34CaO-30Al$_2$O$_3$-36SiO$_2$, or Ta$_2$O$_5$, or their mixtures or similar glasses and ceramics on said laser medium.

7. The method of claim 1, further comprising heating said laser medium masked with the mask in a vacuum or gaseous environment.

8. The method of claim 7, wherein said heating comprises heating in an oxidizing gaseous environment.

9. The method of claim 7, wherein said oxidizing gaseous environment contains an oxidizing species.

10. The method of claim 9, wherein said oxidizing gaseous environment contains oxygen.

11. The method of claim 7, wherein said heating comprises heating in a reducing gaseous environment.

12. The method of claim 11, wherein said reducing gaseous environment contains a reducing species.

13. The method of claim 12, wherein said reducing gaseous environment contains hydrogen.

14. The method of claim 7, further comprising removing said mask from said laser medium.

15. The method of claim 1, further comprising fabricating a frit.

16. The method of claim 15, further comprising mixing said frit with water to form a slurry.

17. The method of claim 6, wherein mixing said frit with water comprises mixing said frit with de-ionized water.

18. The method of claim 16, further comprising depositing said slurry on a surface of said laser medium and thereby forming the mask on said laser medium to obtain a masked medium.

19. The method of claim 18, further comprising heating said masked medium.

20. The method of claim 19, further comprising removing said mask from said laser medium.

21. The method of claim 20, wherein removing said mask comprises grinding said mask.

22. The method of claim 21, further comprising polishing said laser medium after grinding said mask.

23. A method of fabricating a gain medium having a spatially variable gain profile, the method comprising:
   applying a mask to a surface of the gain medium to obtain a masked gain medium, the gain medium having a dopant therein, wherein the dopant includes a first species at a first valence state; and heat-treating the masked gain medium to convert the first species into a second species at a second valence state, wherein the mask is configured to suppress valence conversion from the first valence state into the second valence state so that the first species and the second species are distributed in the gain medium with density profiles that vary spatially.

24. The method of claim 23, wherein applying the mask comprises applying a glaze on the surface of the gain medium.

25. The method of claim 24, wherein applying the glaze comprises applying a high temperature ceramic glaze on the gain medium.

26. The method of claim 23, wherein applying the mask comprises applying a ceramic mask on the surface of the gain medium.

27. The method of claim 23, wherein said applying the mask comprises applying a glass mask on the surface of the gain medium.

28. The method of claim 23, wherein said applying the mask comprises applying at least one of $CaO-Al_2O_3-SiO_2$, $CaO-Al_2O_3$, $MgO-Al_2O_3-SiO_2$, $ZrO_2$, $8Y_2O_3-ZrO_2$, $34CaO-30Al_2O_3-36SiO_2$, or $Ta_2O_5$, or their mixtures or similar glasses and ceramics on the gain medium.

29. The method of claim 23, wherein heat-treating the masked medium comprises heating the masked medium in a vacuum or gaseous environment.

30. The method of claim 29, wherein heat-treating comprises heating in an oxidizing gaseous environment.

31. The method of claim 30, wherein heating in the oxidizing environment comprises heating in a presence of oxygen.

32. The method of claim 29, wherein heat-treating comprises heating in a reducing gaseous environment.

33. The method of claim 32, wherein heating in the reducing environment comprises heating in an environment containing hydrogen.

34. The method of claim 23, further comprising removing the mask from said gain medium.

35. The method of claim 34, wherein removing the mask comprises grinding the mask.

36. The method of claim 35, further comprising polishing the gain medium after grinding the mask.

37. The method of claim 23, wherein heat-treating comprises heat-treating the masked gain medium so that a distribution of the first species and the second species vary spatially relative to the surface.

38. The method of claim 23, wherein the gain medium is elongated along a first direction and wherein the heat-treating comprises heat treating the masked gain medium so that a concentration of the second species at the second valence state is higher than a concentration of the first species at the first valence state at opposite ends along the first direction of the elongated gain medium.

39. The method of claim 23, wherein the heat-treating comprises heat-treating the masked gain medium so that a concentration of the first species at the first valence state increases with distance from the surface and the concentration of the second species at the second valence state decreases with distance from the surface.

* * * * *

UNITED STATES PATENT AND TRADEMARK OFFICE
CERTIFICATE OF CORRECTION

| | | |
|---|---|---|
| PATENT NO. | : 8,189,634 B2 | Page 1 of 1 |
| APPLICATION NO. | : 13/191775 | |
| DATED | : May 29, 2012 | |
| INVENTOR(S) | : David S. Sumida et al. | |

It is certified that error appears in the above-identified patent and that said Letters Patent is hereby corrected as shown below:

Claim 9, in Column 8, line 34, delete "claim 7" and insert -- claim 8 --; and

Claim 17, in Column 8, line 51, delete "claim 6" and insert -- claim 16 --.

Signed and Sealed this
Twenty-fourth Day of July, 2012

David J. Kappos
*Director of the United States Patent and Trademark Office*